Sept. 12, 1961     A. R. CONTI ET AL     2,999,301
CUTTING TOOL
Filed Feb. 24, 1959
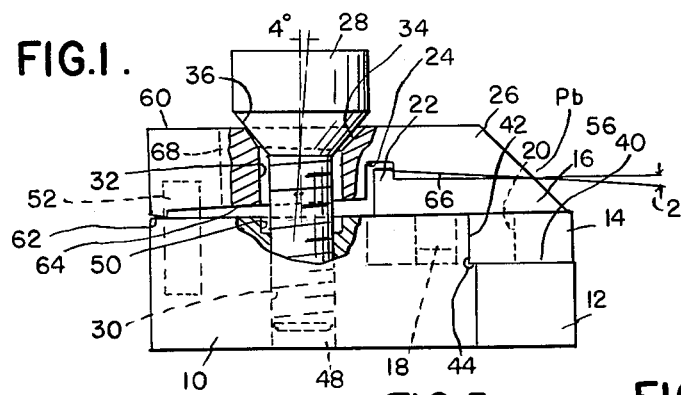
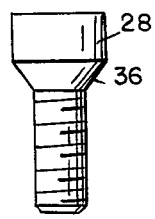
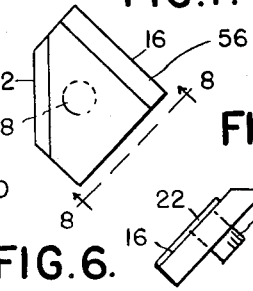
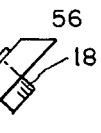
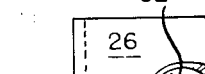
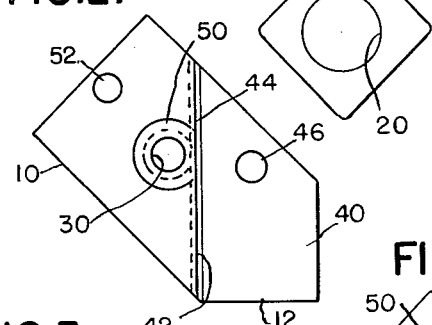
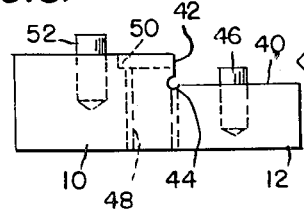
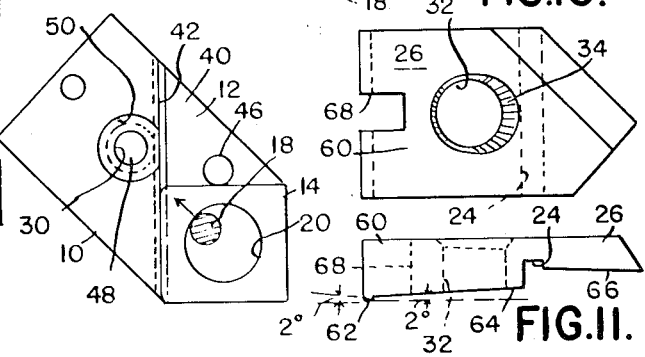
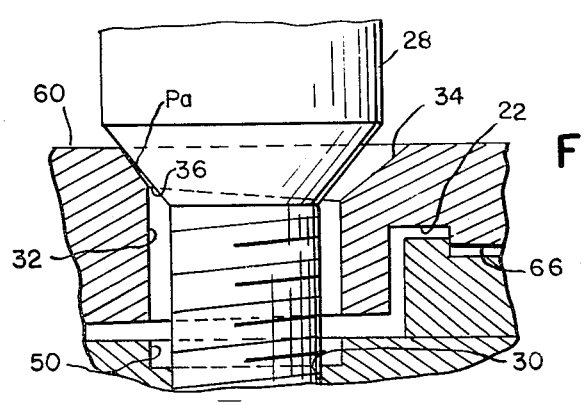
INVENTORS
ALFRED R. CONTI
DANIEL J. MENTER
ATTORNEYS

United States Patent Office 2,999,301
Patented Sept. 12, 1961

2,999,301
CUTTING TOOL
Alfred R. Conti, 7730 Detroit Blvd., Walled Lake, Mich., and Daniel J. Menter, 3309 Harold St., Saginaw, Mich.
Filed Feb. 24, 1959, Ser. No. 794,995
5 Claims. (Cl. 29—96)

The present invention relates to a cutting tool, and more particularly, to a tool using prismatic blades capable of being turned and inverted for use in a plurality of positions.

The present application is a continuation-in-part of our prior copending application Serial No. 646,897, filed March 18, 1957.

It is an object of the present invention to provide a tool designed to insure accurate location of a prismatic cutting blade as an incident to clamping the blade in operating position.

More specifically, it is an object of the present invention to provide clamping means for supporting a prismatic blade having a relatively large central opening therein, including means engageable in the opening in said blade and operable as in incident to the clamping operation to urge the blade into locating engagement with a pair of locating surfaces.

It is a feature of the present invention to provide a cutting tool comprising a support body having a support surface and a pair of angularly disposed locating surfaces to receive a prismatic cutting blade having an enlarged central opening therein, an adaptor therein engageable with one side of the blade and having a projection received in the opening therein, a clamping member having means engageable with said adaptor and a screw for connecting said clamping means to said support, and surfaces coacting between said screw and clamping means to effect movement of said clamping means and of said adaptor in a direction to move said blade into locating engagement with said locating surfaces prior to clamping of said adaptor and blade by said clamping member.

It is a further feature of the present invention to provide structure as described in the preceding paragraph, in which the surfaces acting between said clamping member and screw effective to move said clamping member and adaptor on said support body comprise a conical counterbore in said clamping member and a conical actuating surface on said screw.

It is a further feature of the present invention to provide a cutting tool as described in the preceding paragraph in which the cone angle of said counterbore is smaller than the cone angle on said screw.

It is a further feature of the present invention to provide structure as described in the preceding paragraphs in which said clamping member has angularly formed under-surfaces effective to provide initial limited contact between end portions of said clamping member with said support body and with said adaptor.

Other objects and features of the invention will become apparent as the description proceeds, especially when taken in conjunction with the accompanying drawings, illustrating preferred embodiments of the invention, wherein:

FIGURE 1 is a side elevation of the cutting tool in assembled relation, with parts broken away.

FIGURE 2 is a plan view of the support body.

FIGURE 3 is an elevational view of the support body shown in FIGURE 2.

FIGURE 4 is a plan view of the prismatic cutting blade.

FIGURE 5 is a side elevation of the cutting blade shown in FIGURE 4.

FIGURE 6 is a side elevation of the adaptor.

FIGURE 7 is a plan view of the adaptor shown in FIGURE 6.

FIGURE 8 is a side view of the adaptor moving in the direction of the arrows 8—8, FIGURE 7.

FIGURE 9 is a plan view of the support body with the cutting blade in position thereon and also showing the locating engagement between the blade and adaptor.

FIGURE 10 is a plan view of the clamping member.

FIGURE 11 is a side elevational view of the clamping member.

FIGURE 12 is an elevational view of the screw employed in the cutting tool.

FIGURE 13 is an enlarged fragmentary diagrammatic view showing the initial engagement between the screw and clamping member.

The cutting blade used in the cutting tool disclosed herein is referred to as prismatic since it is generally in the form of a regular polygon. The specific form of blade shown herein is square although it will be appreciated that the blade may be triangular or have more than four sides is desired. In some cases the blade may even be of circular configuration.

It is a feature to provide a blade having a relatively large central opening. This serves a number of useful purposes among which is the conservation of the material of the cutting blade. Cutting blades of this type are formed of hard cutting material such for example as tungsten carbide and hence the material is relatively expensive. By using a relatively large central opening occupying a substantial proportion of the total volume of the blade, important savings in material are obtained. The second advantage of using a prismatic blade with a relatively large central opening is that it facilitates the assembly of parts since in assembly it is necessary only to locate a projection of an adaptor within the opening. The projection of the adaptor, as will subsequently appear, is relatively small and hence there is no problem in inserting it into the relatively large central opening of the blade.

The present invention is particularly useful since it insures that every time the blade is loosened in its holder and turned to a new position, it is first positively moved to extremely accurately located position before it is clamped in such position ready for cutting. Movement of the blade into the accurately located position is accomplished in a fully automatic manner and it is impossible for the operator to clamp the blade before it is positively moved to its accurately located position.

Referring now to the drawings, in FIGURE 1 the cutting tool is illustrated as comprising the support 10 having a reduced end portion 12 on which the reversible and invertable prismatic cutting blade 14 is supported. Engaging the upper surface of the blade 14, as seen in FIGURE 1, is an adaptor 16 having a downwardly extending projection 18 receivable in an enlarged central opening 20 in the blade. The adaptor includes an upwardly extending elongated projection 22 receivable in a correspondingly elongated slot 24 provided in the clamping member 26 which is located and retained on the support 10 by a screw 28. The screw is threaded into an opening 30 in the support body and passes through an enlarged opening 32 in the clamping member 26. Engagement between the screw and clamping member is at a conical counterbored surface 34 at the top of the clamping member and a similar but specifically different conical surface 36 provided on the screw 28.

For a complete understanding of the coaction and operation of the components of the cutter reference will now be made to detail figures showing the exact shape and construction of the several components.

Referring first to FIGURES 2 and 3 the support 10 comprises a body having a flat blade supporting and locating surface 40 and a second flat blade locating surface 42 at right angles to the surface 40. The intersection between the surfaces 40 and 42 is provided with a channel 44 to prevent interference with a corner of a cutting blade. Received in a drilled opening in the reduced blade supporting portion 12 of the support 10 is a locating pin 46. The support is provided with a tapped opening 48 the upper portion of which is counterbored as indicated at 50. A pin 52 is provided in the support 10 for a purpose which will presently appear. It is desired to emphasize at this time that the lower and upper surfaces of the support 10, as appearing in FIGURE 3, are parallel and that the tapped opening 48 extends through the support body in a direction strictly perpendicular to the upper and lower surfaces of the support body.

Referring next to FIGURES 4 and 5, there is shown a prismatic cutting blade 14 in the form of a square flat body opposite edges of which are perpendicular to each other and the side surfaces of the body. The blade is provided with an enlarged opening 20 which as shown has a diameter equal to about 60% of the side dimension of the blade. In a specific case the blade may be approximately .500" square and the central hole have a diameter of approximately .300". The dimensions of the hole do not enter into accuracy of locating of the blade and hence are not critical. The particular blade referred to has a thickness of .125" and has its corners rounded at approximately 1/16" radius.

Associated directly with the prismatic blade and controlling its location on the support is an adaptor 16, details of which are best illustrated in FIGURES 6–8. In these figures the adaptor is shown as in the form generally of a relatively thin flat body having a relatively short pin 18 projecting downwardly from the underside of the adaptor and adapted to be received within the enlarged opening 20 in the blade 14. The adaptor includes a relatively low straight, upstanding elongated projection or rib 22. One edge portion 56 of the adaptor is beveled off at an angle of approximately 45 degrees to provide proper exposure of the cutting edge of the blade and chip control therefor.

Referring now to FIGURE 9, the prismatic cutting blade 14 is shown in position on the supporting and locating surface 40 of the reduced portion 12 of the support 10, having one side thereof engaging the straight locating surface 42 thereof and an adjacent side engaging the locator pin 46. Since a straight side of the blade engages the straight locating surface 42, it is of course apparent that its engagement with the locating pin 46 exactly insures exact position of the blade on the support.

In this figure the location of the pin 18 of the adaptor 16 in the enlarged opening 20 of the blade is shown. As will subsequently appear, means are provided urging the pin 18 in the direction of the arrow extending upwardly and to the left therefrom and accordingly the pin 18 positively insures accurate location of the blade on the locating and supporting surface 40 and against the locating surface 42 and locating pin 46.

Referring to FIGURES 10 and 11, the detailed construction of the clamping member 26 is shown. The clamping member 26 is formed of flat stock having a flat horizontal upper surface 60 as seen in FIGURE 11. At one end of the underside of the clamping member 26 is an elongated relatively low projection 62 the undersurface of which is slightly inclined upwardly and to the left as for example at an angle of approximately 2 degrees as illustrated. The underside of the clamping member 26 is further provided with an inclined surface 64 which as seen in FIGURE 11, is inclined upwardly and to the right from its intersection with the projection 62. The surface 64 terminates at the transversely extending groove 24 which receives the projection 22 on the adaptor 16 as previously described. To the right of the groove 24, as seen in FIGURE 11, the clamping member 26 is of reduced thickness and its under surface 66 is inclined downwardly and to the right from its intersection with a side of the groove 24. In addition, the clamping member 26 is provided with a laterally inwardly extending recess 68 for receiving the pin 52 on the support 10, and guiding the clamping member as it moves to the left, as viewed in FIGS. 1 and 13. Finally, the clamping member 26 is provided with a cylindrical opening 32 extending therethrough, the axis of the cylindrical opening being strictly vertical as seen in FIGURE 11, or in other words, perpendicular to the upper surface 60 thereof. At its upper end the opening 32 is conically counterbored and the axis of the counterbore is inclined at a small angle, as for example 4 degrees from the vertical as shown. Accordingly, the countersunk surface 34 as viewed from above and as seen in FIGURE 10, appears non-symmetrical with respect to the cylindrical opening 32.

Associated with the structure so far described is a screw 28 the lower portion of which is threaded for reception in the threaded opening 30 of the support. Adjacent its upper end the screw is provided with a conical surface 36 adapted to cooperate with the conical countersunk surface 34 at the top of the clamping member 26. The included cone angle of the conical surface 36 of the screw is slightly greater than the included cone angle of the countersunk surface 34 of the clamping member 26 with the result that when the screw is tightened its conical surface 36 engages the conical countersunk surface 34 of the clamping member at a point Pa.

With the foregoing rather detailed description of the components, the operation of the cutting tool as it is assembled, will now be described.

A cutting blade 14 is placed on the supporting and locating surface 40 with one edge thereof in proximity to the locating surface 42 and an adjacent edge in proximity to the locating pin 46. The adaptor 16 is next positioned over the blade 14 with its pin 18 received within the enlarged opening 20 of the blade. Next, the clamping member 26 is brought into position with the groove 24 therein in position to receive the upper edge of the elongated projection 22 provided on the adaptor 16. At this time the parts occupy the position best illustrated in FIGURE 1 and when the screw 28 is inserted through the opening 32 its conical surface 36 will engage the conical counterbored surface 34 of the clamping member 26. If the adjacent surfaces of the blade 14 are not in positive firm engagement with the locating surface 42 and the locating pin 46, tightening of the screw will shift the blade into accurately located position. It will be noted that when the blade is first tightened, the under surface of the clamping member 26 engages the upper surface of the support 10 along one edge of the downward elongated projection 62 of the clamping member and that the engagement between the under surface of the clamping member and the adaptor 16 is limited to substantially point contact at the point designated Pb in FIGURE 1. Accordingly, the blade, adaptor and clamping element are all movable to the left as seen in FIGURE 1, as guided in this direction by the pin 52 in recess 68, which will result in movement of the blade into accurately located position. After the blade has been located, further tightening of the screw 28 is effective to clamp the blade in its accurately located and operating position. Actually, it is not necessary to clamp the clamping member 26 extremely tightly since the blade is adequately supported on the flat supporting and locating surface 40 against loads imposed during the cutting operation. However, if the screw is tightened down very firmly the clamping member may be bent so that its surfaces 64 and 66 become more closely parallel to the upper surfaces of the support and adaptor as seen in FIGURE 1.

From the foregoing it will be observed that a construction is provided which insures that when the blade is clamped in position, actual clamping of the blade is positively preceded by movement of the blade to accurately located position. In other words, the forces which clamp the blade in operating position cannot be developed until the blade has been moved into accurately located position in which position further movement is arrested, thus giving rise to reactions which permit clamping of the blade.

The drawings and the foregoing specification constitute a description of the improved cutting tool in such full, clear, concise and exact terms as to enable any person skilled in the art to practice the invention, the scope of which is indicated by the appended claims.

What we claim as our invention is:

1. A cutting tool comprising a support body having a flat support surface thereon and a pair of locating surfaces extending outwardly from said support surface, a flat polygonal blade on said support surface having an opening therein and engageable with said locating surfaces, a clamp mounted on said support body and movable thereon in a direction generally parallel to said support surface and having substantial components toward both of said locating surfaces, an adaptor intermediate said clamp and blade coupling said clamp to said blade at said opening for movement of the blade in said direction, said adaptor having a projection loosely received in the opening in said blade to so couple the latter, an elongated tongue and groove connection between said clamp and said adaptor extending in a direction generally transverse to the direction of movement of said clamp on said support body, threaded means connected to said support body and engageable with said clamp, and camming surfaces on said threaded means and clamp effective to move said clamp and blade to locate said blade against both of said locating surfaces and thereafter to clamp said blade in located position on said support surface.

2. A cutting tool comprising a support body having a flat support surface thereon and a pair of locating surfaces extending outwardly from said support surface, a flat polygonal blade on said support surface having an opening therein and engageable with said locating surfaces, a clamp mounted on said support body and movable thereon in a direction generally parallel to said support surface and having substantial components toward both of said locating surfaces, means coupling said clamp to said blade at said opening for movement of the latter in said direction, and threaded means connected to said support body and engageable with said clamp, said clamp having a conically shaped recess in the surface opposite said support body, said threaded means including a similar conical surface movable toward said support body and engageable in camming relation with the conical recess in a direction to obtain said movement of the clamp and blade, the conical surface of said threaded means having an included cone angle slightly greater than that of said conical recess.

3. A cutting tool comprising a support body having a flat support surface thereon and a pair of locating surfaces extending outwardly from said support surface, a flat polygonal blade on said support surface having an opening therein and engageable with said locating surfaces, a clamp mounted on said support body and movable thereon in a direction generally parallel to said support surface and having substantial components toward both of said locating surfaces, means coupling said clamp to said blade for movement of the latter in said direction, and threaded means connected to said support body and engageable with said clamp, said clamp having a conically shaped recess in the surface opposite said support body, said threaded means including a similar conical surface movable toward said support body and engageable in camming relation with the conical recess, the axis of said conical recess being inclined slightly from parallelism to the axis of the conical surface of said threaded means in a direction to obtain said movement of the clamp and blade.

4. A cutting tool comprising a support body having a flat support surface thereon and a pair of locating surfaces extending outwardly from said support surface, a flat polygonal blade positioned on said support surface and engageable with said locating surfaces, a clamp mounted on said support body and movable thereon in a direction generally parallel to said support surface and having substantial components toward both of said locating surfaces, means coupling said clamp to said blade for movement of the latter if said direction, said clamp having an opening therethrough perpendicular to the surface of said support body on which said clamp is movable and provided with an outwardly flared conical recess at its outer end, and threaded means extending into said last named opening and including a conical portion movable into camming engagement with said recess in a direction to obtain said movement of the clamp and blade, the included cone angle of said recess being slightly less than the included cone angle of the conical portion of said threaded means.

5. A cutting tool comprising a support body having a flat support surface thereon and a pair of locating surfaces extending outwardly from said support surface, a flat polygonal blade on said support surface having an opening therein and engageable with said locating surfaces, a clamp mounted on said support body and movable thereon in a direction generally parallel to said support surface and having substantial components toward both of said locating surfaces, means coupling said clamp to said blade for movement of the latter in said direction, said clamp having an opening therethrough perpendicular to the surface of said support body on which said clamp is movable and provided with an outwardly flared conical recess at its outer end, and threaded means extending into said last named opening and including a conical portion movable into camming engagement with said recess in a direction to obtain said movement of the clamp and blade, the axis of said conical recess being slightly inclined to the axis of said opening, the included cone angle of said recess being slightly less than the included cone angle of the conical portion of said threaded means.

References Cited in the file of this patent

UNITED STATES PATENTS

| | | |
|---|---|---|
| 717,601 | Normand | Jan. 6, 1903 |
| 936,793 | Midelleton | Oct. 12, 1909 |
| 1,964,786 | McLean | July 3, 1934 |
| 2,270,387 | Spector | Jan. 20, 1942 |
| 2,400,856 | Thompson | May 21, 1946 |
| 2,408,476 | Osgood | Oct. 1, 1946 |
| 2,598,581 | McKenna | May 27, 1952 |
| 2,690,610 | Begle | Oct. 5, 1954 |
| 2,716,799 | Bader | Sept. 6, 1955 |
| 2,814,854 | Murray | Dec. 3, 1957 |
| 2,838,827 | Wright | June 17, 1958 |
| 2,870,523 | Richard | Jan. 27, 1959 |
| 2,949,662 | Cook | Aug. 23, 1960 |

FOREIGN PATENTS

| | | |
|---|---|---|
| 1,105,369 | France | June 29, 1955 |